Jan. 14, 1969 L. R. TEEPLE, JR 3,422,219

HIGH DENSITY DATA STORAGE SYSTEM

Filed Sept. 24, 1964

INVENTOR.
LAWRENCE R. TEEPLE JR.

BY Fryer & Tjensvold

ATTORNEYS

United States Patent Office 3,422,219
Patented Jan. 14, 1969

3,422,219
HIGH DENSITY DATA STORAGE SYSTEM

Lawrence R. Teeple, Jr., Palo Alto, Calif., assignor, by mesne assignments, to Technical Operations, Incorporated, Burlington, Mass., a corporation of Delaware Filed Sept. 24, 1964, Ser. No. 399,027
U.S. Cl. 178—6.7 12 Claims
Int. Cl. H04n 5/84

ABSTRACT OF THE DISCLOSURE

This disclosure depicts high density photostorage and retrieval methods and systems wherein, in a recording embodiment, an image of a light source bearing information is presented successively at discrete data stations which are in turn imaged in a fixed closely packed pattern upon a photostorage medium. A scanner for sweeping the source image across the data stations is synchronized with a transport for the record medium to provide for continuous recording. A retrieval system is disclosed which is similar to the described recording system, but with the source and photodetection functions effectively interchanged.

The present invention relates to data storage systems and more particularly to high density photographic data storage systems.

Since the United States first placed a satellite into space in 1958 the amount of data stored on reels of magnetic tape has increased continuously and at a tremendous rate. Each time a satellite is placed into orbit or otherwise projected into space, it relays information back to earth. This information is received by electronic equipment and conditioned for storage on magnetic tape so that the conditions experienced by the satellites can be analyzed and compared with data received from other satellites. As the number of projectiles in space increases the amount of data being directed to earth receiving stations also increases, requiring the storage of more and more information. Last year alone it required a warehouse twenty feet high with floor space of between 75,000 and 80,000 square feet to store the magnetic tape containing satellite gathered information. The rate of accumulation of data on magnetic tape is in fact so great that it will not be possible to consider some data gathered this year for several years to come.

Besides the undesirability of having to acquire and maintain large numbers of warehouses for storing reels of magnetic tape, there are other disadvantages to long term storage of data on magnetic tape.

Data which is stored on magnetic tape while considered permanent is well recognized as being susceptible to distortion due to environmental conditions (i.e. from electrical disturbances in the vicinity of the stored tape), natural loss of domain orientation after long time periods, and undetectable alterations. The ability to undetectably alter information on magnetic tape is recognized to the extent that the Internal Revenue Service will not accept business records which are retained on magnetic tape.

Besides the problems of storage, information preservation and information alteration, the rate at which magnetic tape can receive information and the rate at which information can be recovered therefrom is limited, and considerably slower than desired. When the factors of gap width, rate of change of flux, transducer head pressure, etc. are all considered, the maximum practical speed for running magnetic tape is about 10 feet per second. Thus, it takes approximately 240 seconds to scan $10^8$ bits of digital information recorded on ½ inch tape 2400 feet long.

The present invention teaches a data storage system employing photographic film as the storage media. The system includes radiation means for displaying the data to be stored, photographic film disposed to have latent images of the radiation source imposed thereon, and an optical system for forming separate, distinct, successive images of the radiation source onto the film. In order to read information stored in this form, the film is projected through the same optical system employed to record, and received by photo sensitive devices which transduce the information from a radiation form to an electrical form.

Employing the system taught by the present invention, it is possible to place data onto ½ inch wide film (16 mm.) at ten times the density possible using magnetic tape, thus significantly reducing the amount of storage space necessary to house gathered data. Film, unlike magnetic tape, can be stored indefinitely without compromising the integrity of the stored data, and it is impossible to alter data stored on processed photographic film without the possibility of detection.

In addition, the film on which the data is stored can be run at 100 feet per second during read out, thus providing a data read out system two orders of magnitude faster (one for read out speed and one for data density) than that possible with magnetic tape systems. Also, while 10 feet per second is an upper limit for running magnetic tape, 100 feet per second is a speed within reason for photographic film, well below possible maximums.

The rate of recording data with the present invention is limited by the radiation source and exposure time of the film employed. Using film well known in the art, it is easily possible to record digital data at the rate of one even bit character every 6⅔ micro-seconds, which is considerably faster than recording onto most magnetic tape transports.

Accordingly, it is an object of the present invention to provide a data storage system for storing information on photographic film.

A further object of the present invention is to provide a data storage system having a high density storage wherein data can be recorded and read out at exceptionally high Another object of the present invention is to provide a data storage system which enables information to be permanently recorded in a manner which makes alteration impossible without detection.

Further and more specific objects and advantages of the invention are made apparent in the following specification wherein a preferred form of the invention is described by reference to the accompanying drawing.

Figures 1, 2, 3, 4:
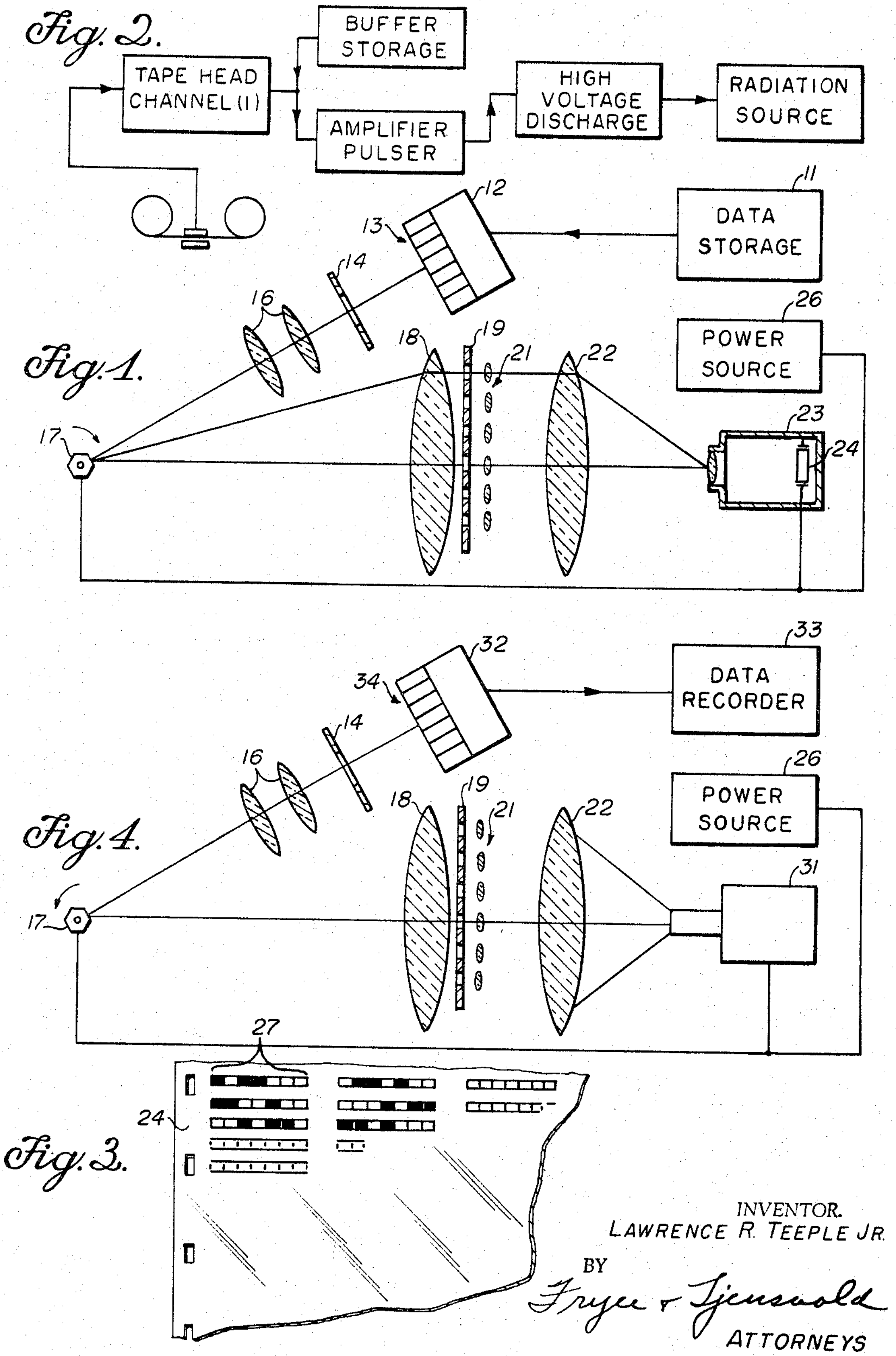
FIG. 1 is a schematic illustration of the data storage system of the present invention.
FIG. 2 is a block diagram illustrating a portion of a tape to film converter.
FIG. 3 is an enlarged view of a portion of film with data thereon.
FIG. 4 is a schematic illustration of a system for reading data on film.

Referring now to FIG. 1, a data source 11 provides electrical signals, representing information, to a radiation source 12 which acts as a transducer to convert electrical energy information into radiation energy information. The source of data to radiation source 12 is in no way limited to any specific device. It may be a system which includes all of the components necessary to detect a desired event or condition, transduce that event into an electrical quantity and process that electrical quantity into an electrical signal which represents digital information. On the other hand, the data source 11 may simply be a quantity of magnetic tape containing digital data previously recorded. In other words, the data source is any means for stimulating the radiation source 12 in a desired manner. While the great bulk of data is handled in digital form the present invention is not restricted to information in this particular form and is capable of handling alpha-numeric information, and for that matter just about any information which can be characterized by a radiation pattern.

The radiation source 12 of necessity will be of a form compatible with the data source 11. For example, if the data from source 11 is digital data, the radiation source 12 can be a plurality of individually excitable light sources 13 (e.g. spark plugs or xenon lamps) which when excited form a digital character which corresponds to the digital character represented by the electrical signal stimulating the light sources. The radiation source is illustrated as having seven light sources making it compatible with a digital system employing six information channels and one parity check channel (seven bit digital characters). The light pattern formed by the light sources 13 is projected through a stop 14 and image reducing lenses 16 to one face of a multi-sided rotating mirror 17.

The image of the radiation source 12 projected onto the mirror 17 is reflected through an optical system including an objective lens 18, a stop 19 having a series of openings, a series of image relay lenses 21 (one for each stop opening) and a field lens 22 to a camera 23. The optical system disposed between the radiation source 12 and the camera 23 is operative to form a plurality of separate, distinct images of the light pattern established by the light sources 13 across the width of an elongated photographic film 24 each time the image light beam is scanned past the objective lens 18. In other words, each time one face the mirror 17 reflects the image of the light sources 13 from the top to the bottom of lens 18 (assuming the mirror 17 is rotating in a clockwise direction) the film 24 has several latent images of the light source pattern disposed thereon wherein the latent images are separate, distinct and successive in time. The number of distinct images which will be projected onto the film 24 each time one face of the mirror 17 reflects the image of the light source 13 across the lens 18 is equal to the number of relay lenses 21 which are provided. Thus, in the system illustrated there will be six images of the patterns formed by light sources 13 imposed across the width of the film 24 each ⅛ of a revolution of the mirror 17. By continuously moving the film 24 lengthwise, successive rows of images are placed onto the film.

A power source 26 drives both the mirror 17 and the film 24 and coordinates their movement to insure that one row of six images is disposed on the film each time one face of the mirror 17 reflects the image of the source 12 across the relay lenses 21.

A portion of film 24 is shown in FIG. 3 with several partial rows of digital data illustrated as having been imposed thereon. The data reads timewise from right to left and top to bottom wherein the time between successive characters 27 is the time required for a face of mirror 17 to move the image of the light sources 13 from one of the stop openings in stop 19 to an adjacent stop opening. By proper arrangement of the components of the optical system, it is possible to space the first character in one row from the last character in the preceding row by the same time separation as exists between characters of the same row. In fact, this occurs quite naturally since as one face of the mirror 17 reflects the image of the pattern of light sources 13 onto the lowermost relay lens 21 the succeeding face of the mirror 17 comes into position to reflect the image onto the uppermost image lens 21.

In operation, the data source 11 provides data at a given rate giving rise to light patterns from source 12. In order to record all of the data (assuming the source of data is magnetic tape) it is necessary to have an image of the light sources imposed onto the film each time the source 12 represents a different character. By using the six relay lens system of FIG. 1 (systems employing more relay lenses can be employed) it is possible to have 48 separate images imposed on the film for every revolution of mirror 17 (once again, the eight sided mirror 17 could be replaced by a mirror having a greater number of sides and thus increase the image rate per revolution). Mirror 17 can easily be operated at several thousand revolutions per second, giving some idea of the recording rates at which the present invention operates.

Since it is only necessary to impose a separate image of the radiation source 12 onto the film 24 at a rate which will insure that each separate character displayed by the lights 13 is contained on the film 24, the rate at which the film and mirror 17 are operated will be determined to a great extent by the rate at which data is made available from the source 11.

Where it is desired to transfer information from magnetic tape onto film for the purpose of compact storage, a system such as that shown in FIG. 2 can be employed and operated at a comfortable speed which will generally be limited by the read out rate of the magnetic tape system.

Where the data source 11 represents a system detecting and reporting an actual physical event as it occurs, it may be desired to run the mirror 17 and film 24 at high speed to get as much data as possible wherein the limiting factor might be the necessary time which an image must be projected on the film to achieve a proper exposure. Keeping this limiting factor in mind, it is possible with the system as shown in FIG. 1 to record data at the rate of approximately one million digital bits per second.

The same optical components employed to record the data onto the film 24 are employed for the purpose of reading the data which has been previously recorded on the film. Referring to FIG. 4, a projector 31 directs the image of the data stored on the film onto the field lens 22, relay lenses 21, object lens 18 and mirror 17 which in this case is operated in a counter-clockwise direction. The projector 31 and mirror 17 are operated by a common power supply which synchronizes their motion to insure that the scan rate of the mirror and the film speed at which the projector is run produce the desired results. The images received by mirror 17 are directed through lenses 16 and stop 14 onto a radiation sensitive device 32 which transduces the radiation signal into an electrical signal which is directed to a data receiver 33. Assuming that the information on the film and projector 31 is in the form of that shown in FIG. 3, the radiation detector 32 is designed to include seven independent light sensitive devices 34 which operate to detect the bits which comprise each character contained on the film. Each time a face of mirror 17 scans the lens 18 it will see six separate images successively in time and in turn will present these six images to the detector 32 at successive intervals of time such that each character in a row on the film is individually read by the detector 32 and transmitted to the data record 33. The data recorder 33 may be any device which is operated by or otherwise employs digital information. The data recorder 33 may simply be a seven channel tape system whereby the information contained and stored on the photographic film is transferred onto magnetic tape.

The particular optical system employed in the present invention which enables separate images to be imposed on the film while using a continuously moving image is known in the art and completely described in the C. D. Miller Patent No. 2,400,887. If 16 mm. film is used in conjunction with the system shown in FIG. 1 there will be six seven bit characters in each row of data. By employing the entire ½ inch of usable film (the film is wider than ½ inch but due to the sprocket holes only ½ inch of film is usable for forming images) to record the six seven bit characters in each row the size of the individual bits will be sufficiently large (approximately .005 inch square) to insure accurate data transmission even though up to ⅔ of an individual bit might be obliterated due to damage to the film in either processing or handling. This is true even at densities of one hundred rows per inch of film. This gives rise to a highly reliable data recording system which experiences only a minimum amount of data rejection. While the present invention has been described primarily with reference to digital information displayed by light sources the invention is not limited to either this form of information nor radiation in the visible range. Lamp panels having hundreds or thousands of individual lights can be employed as can radiating devices displaying information in forms other than digital code forms.

I claim:

1. A method for storing data comprising the steps of:
displaying data to be stored in the form of radiant energy;
repeatedly sweeping the data representing radiant energy through a prescribed arc;
successively presenting an image of the source at several discrete locations on a photographic sheet each time the radiant energy sweeps through the prescribed arc; and
continuously moving the photographic sheet in a direction transverse to the arcuate path through which the radiant energy is swept.

2. A data storage system comprising in combination; radiation means for displaying data to be stored;
an elongated sheet of photographic film capable of having a latent image of said radiation means imposed thereon;
optical means operable to repeatedly scan an image of said radiation means across the width of said elongated sheet of film and successively impose several distinct latent images of said radiation means on said film each time the image traverses said film; and
means for continuously moving said film in a direction transverse to the direction which the image of said radiation means is scanned.

3. A system for storing data on photographic film comprising in combination:
an illumination means projecting a light pattern representing data to be stored;
a rotating mirror disposed to receive the projected illumination means pattern and rotate it through a given arc at least once for each complete revolution of said mirror;
an elongated film sheet capable of having a latent image of said illumination means light pattern imposed thereon;
optical means disposed to intercept the light pattern from said mirror for a portion of the arc which the light pattern traverses, said optical means operable to impose several distinct, successive images of the light pattern on said film for each revolution of said mirror; and
means operable to move said film in a direction transverse to the direction of travel of the light pattern.

4. A data storage system comprising in combination:
a plurality of individually excited light sources disposed in close proximity to one another, and operable to form light patterns representing data to be stored, said light sources being capable of going from an illuminated condition to a non-illuminated condition repeatedly and within a time span of approximately ten microseconds;
an elongated sheet of film having a width and a length and capable of having a latent image of the light pattern produced by said light sources formed thereon;
optical means disposed to receive the light from said sources and operable to form a plurality of separate and distinct images of said light source patterns across the width of said film wherein the images are successive in time and formed at time intervals no greater than the rate of change of the light pattern produced by said light sources, said optical means operable to repeatedly form images across the width of said film; and
drive means associated with said film to move said film lengthwise, said drive means operable at a rate which insures that separate rows of images are formed across the width of said film.

5. The system of claim 4 wherein the image of each individual light source formed on said film is approximately .005 inch square, and the distance between rows of images is approximately .005 inch.

6. The system of claim 4 wherein the light sources form a seven bit digital character.

7. A data photostorage system comprising:
optical data presentation means comprising:
means defining an array of spatially discrete data stations,
a data source responsive to data signals for producing a time-varying radiation pattern representing data contained in the signals;
lens means for forming an image of said data source, and
scanning means between said data source and said data stations for successively presenting said source image at each of said stations;
lens means for imaging said data stations in a predetermined fixed distribution at a storage location; and
means for supporting a photostorage medium at said storage location for recording in succession reimages of said source presented in sequence at said data stations.

8. A system as defined by claim 7 wherein said data stations comprise transversely spaced apertures in a stop member.

9. The system as defined by claim 8 wherein said scanning means comprises a rotatable wheel having a plurality of polygonally arranged plane mirror faces on the periphery thereof for successively deflecting image rays across said data stations.

10. The system as defined by claim 9 wherein said support means comprises a continuous film transport synchronized with said rotatable wheel.

11. An optical retrieval system comprising:
optical means for projecting from a storage record an image of a distribution of discrete information-bearing elements upon an array of discrete data stations;
lens means for forming an image of said data stations; and
scanning means between data stations and a fixed photodetection means for presenting images of said data stations in succession to said photodetection means.

12. A data photostorage method comprising:
producing a time-varying radiation pattern representing data to be stored;
presenting an image of said radiation pattern in succession at an array of spatially discrete data stations;
forming an image of said data stations in a predetermined fixed distribution at a storage location; and
recording on a storage medium in succession reimages of said radiation pattern presented in sequence at said data stations.

References Cited

UNITED STATES PATENTS

| | | | |
|---|---|---|---|
| 3,008,372 | 11/1961 | Willey | 88—24 |
| 3,299,434 | 1/1967 | McNaney | 346—110 |
| 3,328,522 | 6/1967 | Stone | 178—6.7 |

ROBERT L. GRIFFIN, *Primary Examiner.*

H. W. BRITTON, *Assistant Examiner.*

U.S. Cl. X.R.

178—7.1, 6.6, 15; 346—107, 108